(12) United States Patent  
He et al.

(10) Patent No.: US 12,550,241 B2
(45) Date of Patent: Feb. 10, 2026

(54) BACKLIGHT CONTROL METHOD AND SYSTEM, DISPLAY DEVICE, AND READABLE STORAGE MEDIUM

(71) Applicants: Beijing BOE Display Technology Co., Ltd., Beijing (CN); BOE Technology Group Co., Ltd., Beijing (CN)

(72) Inventors: Jianzi He, Beijing (CN); Shou Li, Beijing (CN); Naijia Guo, Beijing (CN); Zhiming Meng, Beijing (CN); Junning Su, Beijing (CN); He Chao, Beijing (CN); Yucheng Zhao, Beijing (CN); Minghan Li, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 19 days.

(21) Appl. No.: 18/271,034

(22) PCT Filed: Mar. 25, 2022

(86) PCT No.: PCT/CN2022/083154
§ 371 (c)(1),
(2) Date: Jul. 5, 2023

(87) PCT Pub. No.: WO2023/178681
PCT Pub. Date: Sep. 28, 2023

(65) Prior Publication Data
US 2024/0422880 A1   Dec. 19, 2024

(51) Int. Cl.
*G02F 1/13357* (2006.01)
*H05B 47/105* (2020.01)

(52) U.S. Cl.
CPC ......... *H05B 47/105* (2020.01); *G02F 1/1336* (2013.01)

(58) Field of Classification Search
CPC .............. G09G 3/3607; G09G 3/2007; G09G 2320/0276; G09G 2300/0271; G09G 2320/0673
See application file for complete search history.

(56) References Cited

U.S. PATENT DOCUMENTS

2007/0182338 A1*  8/2007  Shteynberg ........ H05B 45/3577
                                              315/200 R
2010/0127963 A1    5/2010  Nanbu
(Continued)

FOREIGN PATENT DOCUMENTS

CN    101682977 A    3/2010
CN    112051942 A    12/2020
(Continued)

OTHER PUBLICATIONS

PCT/CN2022/083154 international search report.
PCT/CN2022/083154 Written Opinion.

*Primary Examiner* — Kevin M Nguyen
(74) *Attorney, Agent, or Firm* — IPro, PLLC (57) ABSTRACT

Provided are a backlight control method and system, a display device and a readable storage medium. The backlight control method includes: obtaining a backlight control signal, where the backlight control signal includes a mode signal and a data signal (21); obtaining the mode signal in the backlight control signal, where the mode signal includes a phase adjustment signal or a local dimming signal (22); in response to that the mode signal is the phase adjustment signal, writing the data signal corresponding to the mode signal into a light source drive module, such that the light source drive module adjusts a phase of a backlight source based on the data signal (23). By adding the phase adjustment signal to the backlight control signal, a backlight (Continued)

refresh phase may be directly adjusted by a front end device, without adding hardware, bringing conveniences and speediness.

16 Claims, 2 Drawing Sheets

(56) References Cited

U.S. PATENT DOCUMENTS

| | | | |
|---|---|---|---|
| 2011/0050105 A1* | 3/2011 | Chong | H05B 41/2827 315/297 |
| 2012/0313913 A1* | 12/2012 | Shiraki | G09G 3/3648 345/207 |
| 2020/0066213 A1 | 2/2020 | Zhang | |
| 2020/0103705 A1* | 4/2020 | Chen | H05B 45/32 |

FOREIGN PATENT DOCUMENTS

| | | |
|---|---|---|
| CN | 105579943 B | 10/2021 |
| TW | 201040596 A | 11/2010 |
| WO | 2015050888 A1 | 4/2015 |

* cited by examiner

BACKLIGHT CONTROL METHOD AND SYSTEM, DISPLAY DEVICE, AND READABLE STORAGE MEDIUM

CROSS-REFERENCE TO RELATED APPLICATIONS

This application is a national stage of international PCT Application No. PCT/CN2022/083154, filed on Mar. 25, 2022, the entire contents of which are incorporated herein by reference.

TECHNICAL FIELD

The present disclosure relates to the field of data processing technologies, and in particular to a backlight control method and system, a display device, and a readable storage medium.

BACKGROUND

As the sizes and brightness of the display products continuously increase, more backlight drive devices are required for the display products. Thus, more interference is generated by the backlight drive devices accordingly. For example, some interference frequencies are approximate to the frequencies of the touch screens, possibly affecting normal operation of the touch screens or worsening the EMI performance.

SUMMARY

The present disclosure provides a backlight control method and system, a display device, a readable storage medium, so as to address the shortcomings of related arts.

According to a first aspect of embodiments of the present disclosure, there is provided a backlight control method, including:
  obtaining a backlight control signal, where the backlight control signal includes a mode signal and a data signal;
  obtaining the mode signal in the backlight control signal, where the mode signal includes a phase adjustment signal or a local dimming signal;
  in response to that the mode signal is the phase adjustment signal, writing the data signal corresponding to the mode signal into a light source drive module, such that the light source drive module adjusts a phase of a backlight source based on the data signal.

Optionally, obtaining the mode signal in the backlight control signal includes:
  analyzing the mode signal in the backlight control signal; where a value of the mode signal includes a first value for indicating a phase adjustment mode and a second value for indicating a local dimming mode;
  in response to that the value of the mode signal is the first value, determining the mode signal is the phase adjustment signal; in response to that the value of the mode signal is the second value, determining the mode signal is the local dimming signal.

Optionally, the method further includes:
  in response to detecting a report point signal, obtaining a backlight control signal including the mode signal that is a phase adjustment signal and the data signal that is a backlight refresh phase.

Optionally, obtaining the backlight control signal including the mode signal that is the phase adjustment signal and the data signal that is the backlight refresh phase includes:
  obtaining a current backlight refresh phase and a current scanning frequency of a display screen;
  obtaining an immediately-next backlight refresh phase after the current backlight refresh phase in order in a preset lookup table;
  adjusting the mode signal of the backlight control signal to the phase adjustment signal and the data signal to the immediately-next backlight refresh phase so as to obtain the backlight control signal.

Optionally, obtaining the backlight control signal including the mode signal that is the phase adjustment signal and the data signal that is the backlight refresh phase includes:
  obtaining a backlight refresh phase corresponding to a position in the report point signal;
  determining a target backlight refresh phase whose difference from the backlight refresh phase is more than a preset threshold in a preset lookup table;
  adjusting the mode signal of the backlight control signal to the phase adjustment signal and the data signal to the target backlight refresh phase so as to obtain the backlight control signal.

Optionally, the method further includes:
  sending a target scanning frequency corresponding to the phase adjustment signal to the display screen, such that the display screen is adjusted to the target scanning frequency.

Optionally, the method further includes:
  performing checking on the backlight control signal.

Optionally, the method further includes:
  in response to that the mode signal is the local dimming signal, writing the data signal corresponding to the mode signal into the light source drive module, such that the light source drive module adjusts a backlight brightness based on the data signal in the backlight control signal.

According to a second aspect of embodiments of the present disclosure, there is provided a backlight system, including a master control board and a backlight control unit; the backlight control unit is connected with the master control board.
  the master control board is configured to, in response to detecting a report point signal, obtain a backlight control signal including a mode signal that is a phase adjustment signal and a data signal that is a backlight refresh phase;
  the backlight control unit is configured to obtain the backlight control signal including a mode signal and a data signal, and obtain the mode signal in the backlight control signal, where the mode signal includes a phase adjustment signal or a local dimming signal; and in response to that the mode signal is the phase adjustment signal, write the data signal corresponding to the mode signal into a light source drive module, such that the light source drive module adjusts a phase of a backlight source based on the data signal.

Optionally, obtaining, by the backlight control unit, the mode signal in the backlight control signal includes:
  analyzing the mode signal in the backlight control signal; where a value of the mode signal includes a first value for indicating a phase adjustment mode and a second value for indicating a local dimming mode;
  in response to that the value of the mode signal is the first value, determining the mode signal is the phase adjustment signal; in response to that the value of the mode signal is the second value, determining the mode signal is the local dimming signal.

Optionally, obtaining, by the master control board, the backlight control signal including the mode signal that is the phase adjustment signal and the data signal that is the backlight refresh phase includes:

obtaining a current backlight refresh phase and a current scanning frequency of a display screen;

obtaining an immediately-next backlight refresh phase after the current backlight refresh phase in order under the current scanning frequency in a preset lookup table;

adjusting the mode signal of the backlight control signal to the phase adjustment signal and the data signal to the immediately-next backlight refresh phase so as to obtain the backlight control signal.

Optionally, obtaining, by the master control board, the backlight control signal including the mode signal that is the phase adjustment signal and the data signal that is the backlight refresh phase includes:

obtaining a backlight refresh phase corresponding to a position in the report point signal;

determining a target backlight refresh phase whose difference from the backlight refresh phase is more than a preset threshold in a preset lookup table;

adjusting the mode signal of the backlight control signal to the phase adjustment signal and the data signal to the target backlight refresh phase so as to obtain the backlight control signal.

Optionally, the master control board is further configured to send a target scanning frequency corresponding to the phase adjustment signal to the display screen, such that the display screen is adjusted to the target scanning frequency.

Optionally, the backlight control unit is further configured to, after receiving the backlight control signal, perform checking on the backlight control signal.

Optionally, the backlight control unit is further configured to:

in response to that the mode signal is the local dimming signal, write the data signal corresponding to the mode signal into the light source drive module, such that the light source drive module adjusts a backlight brightness based on the data signal in the backlight control signal.

According to a third aspect of embodiments of the present disclosure, there is provided a display device, including the backlight system mentioned in any one item of the second aspect and the display screen;

the display screen is configured to generate a report point signal and send the report point signal to the backlight system;

the backlight system is configured to, based on the report point signal, adjust a backlight refresh phase.

According to a fourth aspect of embodiments of the present disclosure, there is provided a non-transitory computer readable storage medium, where executable computer programs in the storage medium are executed by a processor to perform the method as mentioned in any one item of the first aspect.

The technical solutions provided by the embodiments of the present disclosure may include the following beneficial effects.

From the above embodiments, it can be known that, in the solutions provided by the embodiments of the present disclosure, a backlight control signal may be obtained, where the backlight control signal includes a mode signal and a data signal; then, the mode signal in the backlight control signal is obtained, where the model signal includes a phase adjustment signal or a local dimming signal; then, in response to that the mode signal is the phase adjustment signal, the data signal corresponding to the mode signal is written into a light source drive module, such that the light source drive module adjusts a phase of a backlight source based on the data signal. In the embodiments, with the phase adjustment signal being added to the backlight control signal, the front end device can directly adjust a backlight refresh phase without adding any hardware, bringing convenience and speediness.

It will be understood that, the above general descriptions and subsequent detailed descriptions are merely illustrative and explanatory rather than limiting of the present disclosure.

BRIEF DESCRIPTION OF THE DRAWINGS

The drawings herein which are incorporated in and constitute a part of the specification illustrate embodiments consistent with the specification and serve to explain the principle of the present disclosure together with the specification.

DETAILED DESCRIPTION OF THE EMBODIMENTS

Exemplary embodiments will be described in detail herein, with the illustrations thereof represented in the drawings. When the following descriptions involve the drawings, like numerals in different drawings refer to same or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims. It is to be noted that, in a case of no conflicts, the following embodiments and the features of the embodiments can be mutually combined.

As the sizes and brightness of the display products continuously increase, more backlight drive devices are required for the display products. Thus, more interference is generated by the backlight drive devices accordingly. For example, some interference frequencies are approximate to the frequencies of the touch screens, possibly affecting normal operation of the touch screens or worsening the EMI performance.

At present, the backlight drives of various display devices do not have the function of adjusting a phase by a front end device. When the above problem occurs, it may be solved only by performing firmware adjustment, or adding a filtering circuit or adding a shielding means, which brings inconveniences and increases the costs.

To address the above technical problem, embodiments of the present disclosure provide a backlight control method and system, a display device, and a readable storage medium. Since a master control board in the backlight system may receive audio and video signals from outside the backlight system and generate a backlight control signal based on the analyzed audio and video signals, the above master control board may serve as a front end device of a backlight control unit in the backlight system. The inventive idea of the present disclosure lies in that a phase adjustment signal is added to the backlight control signal of the backlight control unit; when it is detected that the backlight control signal includes the phase adjustment signal, a phase of a backlight source is adjusted so as to achieve the effect of controlling the phase of the backlight source. Alternatively, in some embodiments, the phase of the backlight source is controlled at the front end. Compared with the related arts, no additional hardware is required, thereby simplifying the implementation without increasing the costs.

Figure 1:
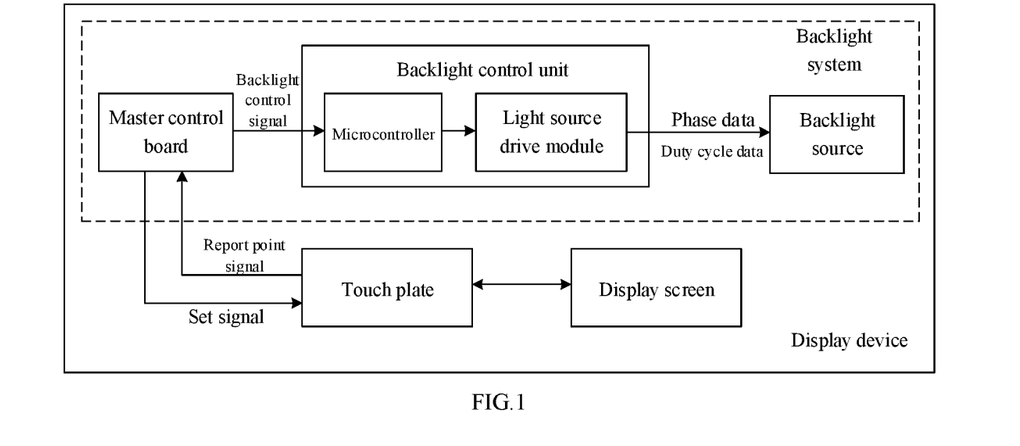
FIG. 1 is a block diagram illustrating a backlight system according to some exemplary embodiments of the present disclosure.

FIG. 1 is a block diagram illustrating a backlight system according to some exemplary embodiments of the present disclosure. As shown in FIG. 1, the backlight system includes a master control board, a backlight control unit and a backlight source. The backlight control unit may include a microcontroller (e.g., microcontroller unit referred to as MCU) and a light source drive module (e.g., LED driver). The master control board is connected to the microcontroller in the backlight control unit, and the light source drive module in the backlight control unit is connected to the backlight source (e.g. LED). The master control board may generate a backlight control signal and send it to the microcontroller in the backlight control unit. The microcontroller may analyze the above backlight control signal to determine a phase or local brightness of the backlight source, that is, a backlight control method provided by the embodiments is implemented, such that the light source drive module adjusts the phase or local brightness of the backlight source.

Figure 2:
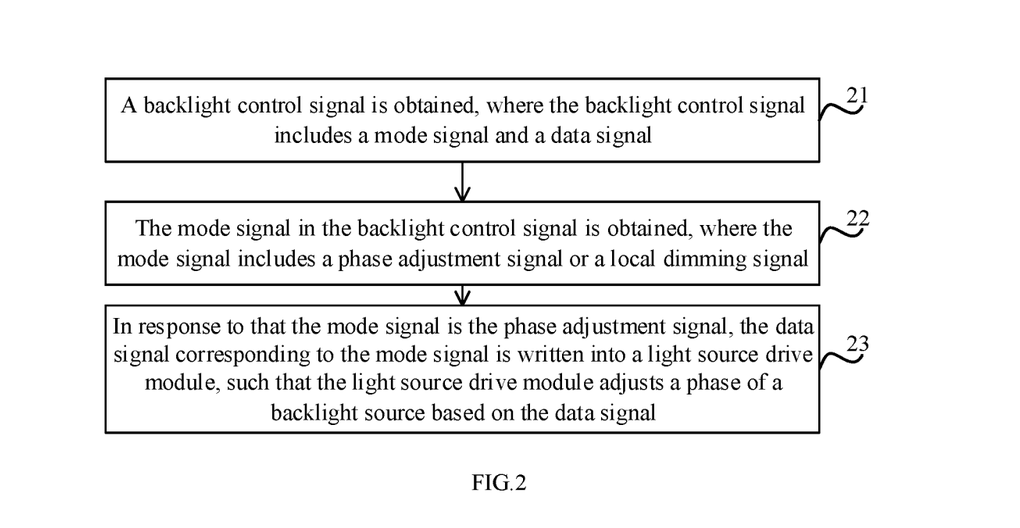
FIG. 2 is a flowchart illustrating a backlight control method according to some exemplary embodiments of the present disclosure.

FIG. 2 shows a backlight control method according to some exemplary embodiments of the present disclosure. As shown in FIG. 2, the backlight control method may include steps S21 to S23.

At step S21, a backlight control signal is obtained, where the backlight control signal includes a mode signal and a data signal.

In this step, the master control board in the backlight system may obtain image frame data to be displayed on a display screen, based on the image frame data, determine backlight data of the display screen, and then based on the backlight data, generate the backlight control signal. The solution for determining the backlight control signal based on the image frame data may be referred to the relevant technologies and the corresponding solutions fall within the scope of protection of the present disclosure. For example, the master control board communicates with the microcontroller via a serial peripheral interface (SPI), and the format of the backlight control signal is as shown in Table 1.

For example, the backlight system is used to adjust the brightness of the backlight source (i.e., adjust the backlight brightness of the display screen). After receiving the backlight control signal, the microcontroller may write duty cycle data of each backlight source into the light source drive module. Since the display screen has a large size, the number of the backlight sources used in the display screen is also large. Thus, in some embodiments, the backlight sources will be partitioned and unified control is performed on the backlight sources in each partition.

It is to be noted that, in the table, SPI Hardware is SPI hardware, SPI Protocol is SPI protocol, VSYNC represents synchronous signal, CS/SDI/SDO/SCK represents chip select information, input signal, output signal and clock signal respectively, High/Low/Freq represents high voltage, low level and time frequency respectively, Indicator/Command/Mode/Dimming Data represents frame header, command, mode and duty cycle data respectively, check sum data represents exclusive OR (XOR) processing value, Data Field Definition represents data field definition, Global Dimming represents global dimming mode, Local Dimming Enable represents enabling the local dimming mode, LD On/off represents turning on or off the local dimming, and 168ea represents 168 pieces of data.

TABLE 1

The backlight control signals of SPI format

| Items | Description | Symbol | Min | Typ. | Max | Result | Remark |
|---|---|---|---|---|---|---|---|
| SPI Hardware | VSYNC, CS/SDI/SDO/SCK | High(V) | 2.4 | 3.3 | 3.6 | | |
| | | Low(V) | 0.0 | 0.0 | 0.7 | | |
| | | Freq.(Mhz) | 2.8 | 2.8 | 16 | | |
| SPI Protocol | SPI Data transmission sequence | | →Indicator(0X 7FF8) →Command: Byte 0xFFFC →Mode: 0xFFFF →Dimming Data(1~168) →Check Sum Data | | | | |
| | Data Field Definition | Global Dimming | Transmit the same data | | | | |
| | | Local Dimming Enable | LD_EN Control: High (Type = 3.3 V): LD On; Low (0~0.8 V/GND): LD Off | | | | |
| | | | Data 1~168ea | | | 168ea | |

It can be understood that, the microcontroller writes the duty cycle data of only one partition at one time and then writes the duty cycle data of a next partition at next time and so on, until the duty cycle data of all partitions are written. A corresponding time period for writing the duty cycle data as above is a phase of the corresponding partition, or a phase of the backlight source. The light source drive module in the backlight control unit may, based on the written duty cycle data, control the backlight source to an on state or an off state, thus adjusting the brightness of the backlight source.

It can be understood that, during a switching process of the light source drive module, for example, when the light source drive module is in an on state, the output voltage of the light source drive module jumps from 0V to a preset voltage (e.g., 5 to 20V); when the light source drive module is in an off state, the output voltage of the light source drive module declines from the preset voltage to 0V. During the switching process of the light source drive module, the output voltage of the light source drive module changes back and forth based on a manner of low-high-low-high and may serve as one electromagnetic radiation source in this case.

If the voltage change frequency of the light source drive module is matched with the operation frequency of a touch plate (a capacitor therein) in the display screen, for example, if the voltage change frequency is equal to the collection frequency of the capacitor in the touch plate, the capacitor in the touch plate may sense a voltage change of the light source drive module and output a report point signal. In the related arts, the master control board may process the above report point signal as a normal report point signal. It can be understood that the above report point signal actually is a misreport point. If the misreport point is processed as a normal report point signal, various problems may be occur, for example, automatic skip to different interfaces and adjustment to corresponding backlight, reducing the use experiences of users.

In this step, the touch plate in the display screen, after detecting the report point signal, may send the report point signal to the backlight system. The master control board in the backlight system, after receiving the above report point signal, determines whether the above report point signal is a normal report point signal (a report point signal generated by the touch plate after detecting a touch operation of a user) or a misreport point signal (a report point signal caused by the light source drive module as pointed in the above embodiments).

In some embodiments, the master control board may detect a duration of the above report point signal; in a case where the above duration is greater than or equal to a preset time length threshold, the master control board may determine that the above report point signal is a misreport point signal; in a case where the above duration is less than the preset time length threshold, the master control board may determine the above report point signal is a normal report point signal. This is because a time length in which the user performs touch operation on the touch display screen is usually short (e.g., 1 to 5 seconds). Thus, when a maximum time length of the touch operation is greater than the above preset time length threshold, the normal report point signal and the misreport point signal may be distinguished. The maximum time length of the touch operation may be an empirical value or obtained by calculating the time lengths of the touch operations of more than a preset number of users based on big data statistics, and this is not limited herein.

In some embodiments, the master control board may detect a touch area corresponding to the above report point signal. In a case where the touch area is greater than or equal to a preset touch area threshold, the master control board may determine the above report point signal is a misreport point signal; in a case where the touch area is less than the preset touch area threshold, the master control board may determine the above report point signal is a normal report point signal. This is because the user performs touch operation with up to a palm area and usually with an area of one to three finger tips, whereas the area corresponding to the misreport point is usually one patch of area which is greater than the palm area. Therefore, the above preset touch area threshold may be an empirical value or obtained by calculating the palm areas of a plurality of users based on big data statistics or a value between the palm area and the finger tip area. To sum up, an appropriate threshold may be selected based on specific scenarios and the corresponding solutions will fall within the scope of protection of the present disclosure.

In some embodiments, the master control board may detect a length corresponding to the above report point signal. In a case where the above length is greater than or equal to a preset length threshold, the master control board may determine the above report point signal is a misreport point signal; in a case where the above length is less than the preset length threshold, the master control board may determine the above report point signal is a normal report point signal. This is because the user performs touch operation with up to a palm length whereas the length of the misreport point is usually one long strip (for example, from one side of the display screen to the other side of the display screen), which is usually greater than the length of the touch operation. Based on the above contents, the above preset length threshold may be an empirical value, or obtained by calculating the lengths of the touch operations of a plurality of users based on big data statistics. To sum up, an appropriate threshold may be selected based on specific scenarios and the corresponding solutions will fall within the scope of protection of the present disclosure.

In some embodiments, the master control board may detect a shape corresponding to the above report point signal and determine whether the shape is a hand shape, for example, elliptical shape or palm shape. A shape recognition model, such as a neural network model, may be disposed inside the master control board and a touch image containing corresponding to the report point signal is input into the above shape recognition model which identifies whether it is a hand shape. When the above shape is not a hand shape, the master control board may determine the above report point signal is a misreport point signal; when the above shape is a hand shape, the master control board may determine the above report point signal is a normal report point signal. This is because the shape of the touch operation position where the user performs touch operation is regular and smooth, whereas the shape of the position corresponding to the misreport point is usually irregular.

It is to be noted that in the above embodiments, descriptions are made to the solution in which whether a report point signal is a misreport point signal is determined based on the parameters such as time length, area, shape and length. In practical applications, at least two of the above parameters may also be combined, for example, whether a report point signal is a misreport point signal is determined based on combination of area and time length and so on. In a case where no conflicts between parameters, the solutions based on these combinations still fall within the scope of protection of the present disclosure.

In this step, after determining the report point signal is a misreport point signal, the master control board may obtain a backlight control signal including the mode signal that is the phase adjustment signal and the data signal that is the backlight refresh phase.

In some embodiments, the master control board may obtain a current backlight refresh phase and a current scanning frequency of the display screen, and then obtain a next-order backlight refresh phase of the current backlight refresh phase in a preset lookup table. The lookup table includes at least one backlight refresh phase corresponding to the display screen under different scanning frequencies (on no mutual interference), where at least backlight refresh phase corresponding to each scanning frequency is sorted based on phase size.

In Table 2, the scanning frequencies are the scanning frequencies of the touch plate (TX) in the display screen, CH1 to CH16 represent that the light source drive module includes 1 to 16 channels, 0x00 to 0xFF represent backlight refresh phases, and 0x11, 0x13 and 0x0D represent scanning frequencies.

TABLE 2

Relationship of the scanning frequencies and the backlight refresh phases in the lookup table

| Scanning frequencies | Backlight refresh phases | | | | | | | | | | | | | | | |
|---|---|---|---|---|---|---|---|---|---|---|---|---|---|---|---|---|
| | CH 1 | CH 2 | CH 3 | CH 4 | CH 5 | CH 6 | CH 7 | CH 8 | CH 9 | CH 10 | CH 11 | CH 12 | CH 13 | CH 14 | CH 15 | CH 16 |
| 0x11 | 0x00 | 0x00 | 0x00 | 0x01 | 0x01 | 0x02 | 0x02 | 0x03 | 0x03 | 0x04 | 0x04 | 0x05 | 0x05 | 0x06 | 0x06 | 0x07 |
| 0x13 | 0x00 | 0x05 | 0x0a | 0x0f | 0x15 | 0x1A | 0x1F | 0x25 | 0x2A | 0x2F | 0x35 | 0x3A | 0x00 | 0x00 | 0x00 | 0x00 |
| 0x0D | 0x00 | 0x00 | 0x00 | 0xA8 | 0x02 | 0xFF | 0x7F | 0x00 | 0x00 | 0x00 | 0x49 | 0xCF | 0x07 | 0x00 | 0x00 | 0xFF |

It can be understood that, if the current backlight refresh phase (e.g., the order is 0) is equal to or approximate to the current scanning frequency, the next-order backlight refresh phase (e.g., the order is 1) and the current scanning frequency in the lookup table may have an increased difference or be mismatched, which may not affect the display screen any longer. Thus, the master control board may adjust the mode signal of the backlight control signal to the phase adjustment signal, and adjust the data signal to a next-order backlight refresh phase, so as to obtain a backlight control signal. At this time, the current backlight refresh phase is updated to the next-order backlight refresh phase (i.e., the order of the current backlight refresh phase is 1). If the current backlight refresh phase (the order thereof is 1) still does not satisfy requirements, it is further updated to a next order (e.g., the order is 2) in the lookup table, until no misreport point signal appears. In some embodiments, the backlight refresh phase is adjusted based on order. When the interval of adjacent backlight refresh phases is reasonable (for example, a difference between two adjacent backlight refresh phases is greater than a preset difference threshold), and the number of adjacent backlight refresh phases is small, the backlight refresh phase may be adjusted to a matching backlight refresh phase, that is, noise interference generated by the backlight control unit disappears and the misreport point signal also disappears, thereby improving the user experience.

In some embodiments, the master control board may obtain a backlight refresh phase corresponding to a position in the report point signal, and then determine a target backlight refresh phase more than a preset threshold from the backlight refresh phase in the preset lookup table. The above preset threshold may be an empirical value, or obtained by statistics based on a large number of tests, which aims to ensure the difference between the target backlight refresh phase and the current backlight refresh phase is large enough, such that the noise frequency generating the report point signal is far away from the current scanning frequency of the display screen. Next, the master control board may adjust the mode signal of the backlight control signal to the phase adjustment signal, and adjust the data signal to the above target backlight refresh phase, so as to obtain a backlight control signal. In some embodiments, the target backlight refresh phase more than a preset threshold from the current backlight refresh phase may be obtained so as to quickly adjust to the desired refresh phase, that is, noise interference generated by the backlight control unit disappears and the misreport point signal also disappears, thereby improving the user experience.

In some embodiments, the backlight control signal is in the format of SPI. The master control board may set the value of the mode signal (i.e., Mode) in the backlight control signal to a first value, for example, 0x0000, where the first value represents the phase adjustment mode. After determining the report point signal is a normal report point signal, the master control board may obtain a backlight control signal including the mode signal that is the local dimming signal and the data signal that is the duty cycle data. For example, in a case where the backlight control signal is in the format of SPI, the master control board may set the value of the mode signal (i.e., Mode) to a second value, for example, 0xFFFF, where the second value represents the local dimming mode. Next, the master control board may send the above backlight control signal to the backlight control unit. In this way, the backlight control unit may obtain the backlight control signal which includes the mode signal and the data signal. Furthermore, for example, the master control board communicates with the microcontroller via serial peripheral interface (SPI), and in this case, the backlight control signal of SPI format is as shown in Table 3.

It is to be noted that, phase data represents phase data, i.e. data1 to data8.

It will be noted that, before sending the above backlight control signal to the backlight control unit, the master control board may perform XOR processing on the backlight control signal to obtain a processing result; and then send the above processing result as a part of the backlight control signal to the backlight control unit. Correspondingly, after receiving the backlight control signal, the backlight control unit may perform XOR processing on the backlight control signal to obtain a check result, and then compare the check result with the above processing result; then, if they are same, determine the received backlight control signal is correct; if they are not same, determine the received backlight control signal is incorrect. At this time, the backlight control unit may notify the master control board to re-send it. In this way, the check on the backlight control signal can ensure the backlight control signal can be transmitted normally, finally achieving accurate control on the backlight.

It can be understood that, in addition to the XOR processing, the check on the above backlight control signal may also be performed by generating summation check or cyclic redundancy check code, or by generating a message digest based on message digest algorithm. As long as it is checked that the backlight control signal received by the microcontroller is correct, the above check manners or any combination of the check manners all fall within the scope of protection of the present disclosure.

At step 22, the mode signal in the backlight control signal is obtained, where the mode signal includes a phase adjustment signal or a local dimming signal.

In this step, the backlight control unit in the backlight system may obtain the mode signal in the backlight control signal. For example, the microcontroller in backlight control unit may analyze the mode signal in the backlight control signal. The value of the mode signal may include a first value for indicating a phase adjustment mode and a second value for indicating a local dimming mode. The microcontroller may, in response to that the value of the mode signal is the first value (e.g., 0x0000), determine the mode signal is the phase adjustment signal, or in response to that the value of the mode signal is the second value (e.g., 0xFFFF), determine the mode signal is the local dimming signal.

In some embodiments, with continuous reference to FIG. 1, the master control board may also send a set signal to the touch plate of the display screen. The set signal may be a target scanning frequency or an identification code corresponding to the target scanning frequency. After receiving the above set signal, the touch plate of the display screen

TABLE 3

Backlight control signals of SPI format

| Items | Description | Symbol | Target Values | | | Result | Remark |
|---|---|---|---|---|---|---|---|
| | | | Min | Typ. | Max | | |
| SPI Hardware | VSYNC, CS/SDI/SDO/SCK | High(V) | 2.4 | 3.3 | 3.6 | | |
| | | Low(V) | 0.0 | 0.0 | 0.7 | | |
| | | Freq.(Mhz) | 2.8 | 2.8 | 16 | | |
| SPI Protocol | SPI Data transmission sequence | | →Indicator(0X 7FF8) →Command: Byte 0xFFFC →Mode: 0x0000/0xFFFF →Phase Data(1~168)/ Dimming Data(1~168) →Check Sum Data | | | | |
| | Data Field Definition | Global Dimming | Transmit the same data | | | | |
| | | Local Dimming Enable | LD_EN Control: High (Type = 3.3 V): LD On; Low (0~0.8 V/GND): LD Off Data 1~168ea: 8 bit Dimming Bit 7~Bit 0 | | | 168ea | |

For example, the backlight control signal is in the format of SPI. The microcontroller in the backlight control unit may read the value of Mode from the SPI signal. In a case where the value of the Mode is 0x0000, the microcontroller may determine the mode signal is the phase adjustment signal; in a case where the value of the Mode is 0xFFFF, the microcontroller may determine the mode signal is the local dimming signal.

At step 23, in response to that the mode signal is the phase adjustment signal, the data signal corresponding to the mode signal is written into a light source drive module, such that the light source drive module adjusts a phase of a backlight source based on the data signal.

In this step, the microcontroller in the backlight control unit may, in response to that the mode signal is the phase adjustment signal, write the data signal corresponding to the mode signal (i.e., data signal in a same backlight control signal, which is phase data in this case) into the light source drive module.

It can be understood that, after the phase data is written into the light source drive module, the master control board may also continue generating one backlight control signal which includes the local dimming signal at this time. The microcontroller may, in response to that the mode signal is the local dimming signal, write the data signal corresponding to the mode signal (data signal in a same backlight control signal, which is duty cycle data in this case) into the light source drive module. In this way, the light source drive module may, based on the above phase data, adjust the phase of the backlight source and based on the duty cycle data, adjust the brightness of the backlight source.

In some embodiments, in a case where the backlight control signal is the local dimming signal rather than the phase adjustment signal, the microcontroller in the backlight control unit may, in response to that the mode signal is the local dimming signal, write the data signal corresponding to the mode signal (data signal in a same backlight control signal, which is duty cycle data in this case) into the light source drive module.

may adjust its scanning frequency to the target scanning frequency. There is no mutual interference between the target scanning frequency and the backlight refresh phase of the backlight source, thus avoiding generating misreport point. Hence, in some embodiments, the scanning frequency may be adjusted or adjusted in synchronization with the backlight refresh phase, so as to accelerate correction of misreport point.

Thus, in the solution provided by the embodiments of the present disclosure, a backlight control signal including a mode signal and a data signal may be obtained; then, the mode signal in the backlight control signal is obtained, where the mode signal includes a phase adjustment signal or a local dimming signal; next, in response to that the mode signal is the phase adjustment signal, the data signal corresponding to the mode signal is written into the light source drive module, such that the light source drive module adjusts the phase of the backlight source based on the data signal. As a result, in some embodiments, by adding the phase adjustment signal to the backlight control signal, the backlight refresh phase may be directly adjusted by a front end device without adding hardware, thereby bringing conveniences and speediness.

With the master control board and the microcontroller communicating with each other via SPI interface, a backlight control method provided by the present disclosure will be described below. By referring to FIGS. 1 to 3, the method includes the following steps.

Figure 3:
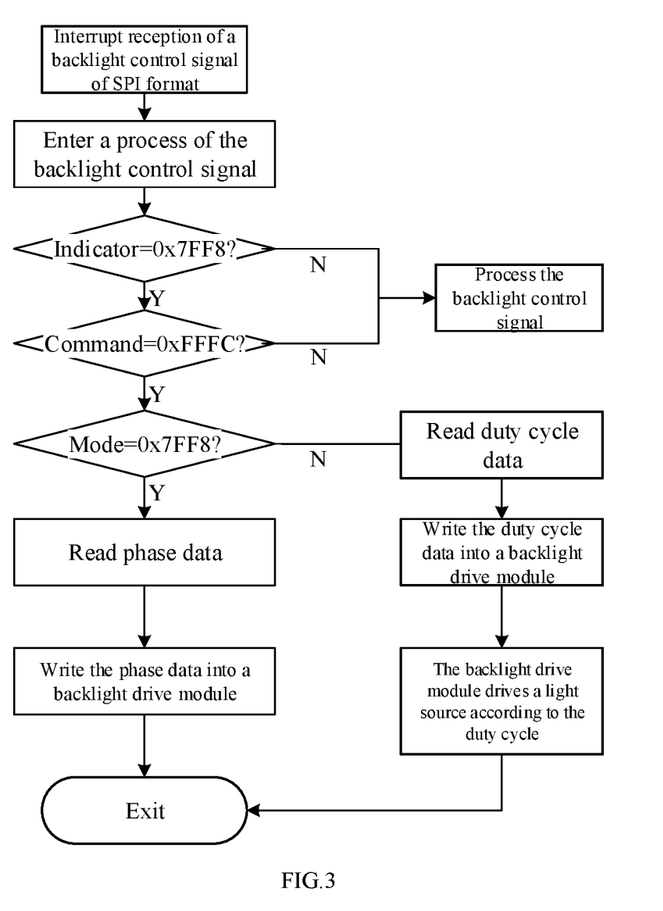
FIG. 3 is a flowchart illustrating another backlight control method according to some exemplary embodiments of the present disclosure.

1. Master Control Board
   (1) A test experiment is performed in advance, and there is no interfering combination of frequency and phase between the scanning frequency of the display screen (the touch plate therein) and the backlight refresh phase, and the above combinations of frequency and phase are stored in the form of lookup table in a local memory of the master control board.
   (2) The backlight system is started for initialization, and at this time, the master control board may select one default combination of a scanning frequency of the display screen and a backlight refresh phase in the lookup table.

(3) When the touch plate sends a report point signal, it is determined whether it is a misreport point signal; if it is a normal report point signal, corresponding operations are performed; if it is a misreport point signal, one combination of scanning frequency and backlight refresh phase is queried for in the lookup table, so as to achieve self-correction of the misreport point.

2. Backlight Control Unit (1) The backlight control signal is obtained and analyzed to obtain the phase adjustment signal and the local dimming signal in the mode signal, that is, mode selection is performed to determine the phase adjustment mode or the local dimming mode. The above phase adjustment signal and the local dimming signal are set by the master control board during generation of the backlight control signal so as to avoid possibly generating an interfering phase, achieving better entire reliability and display effect.

(2) The backlight control signal of SPI format includes:
Indicator: frame header is fixed to 0x7ff8;
Command: command data is 0xfffc;
Mode; mode selection;
Mode-0xffff is the local dimming mode; data signals Data1 to Data168 is the duty cycle data of the light source drive module (LED driver), where Data1 to Data168 means dividing the backlight region of the display screen into 168 partitions.
Mode-0x000 is a phase adjustment mode; in some embodiments, the backlight refresh phase uses Data1 to Data8, totaling eight pieces of data, and Data9 to Data168 are set to 0x000. Since the phase set value of the phase adjustment is 8 bit, and Data1 to Data168 are 16 bit data, Data1 to Data168 may be split into high 8 bit data and low 8 bit data and then written into a register of the light source drive module.

It is to be noted that Data1 to Data168 represents the backlight region is divided into 168 partitions, where each piece of data corresponds to one partition. Thus, for backlight drive, 168 output ends (i.e., channels) are required. Since each backlight drive chip in the light source drive module may provide 16 channels, at least 11 backlight drive chips are needed to cover the channels of the 168 partitions. Considering redundancy, 16 backlight drive chips are selected in some embodiments. Each channel corresponds to 8 bit data and in this case, 256 phases may be selected for the backlight source of each partition. It can be understood that the number of the backlight drive chips and the number of the phases may be adjusted based on specific scenarios, which is not limited herein.

When starting to receive the SPI signal, the microcontroller may identify the Indicator. When the value of the Indicator is 0x7ff8, Command is identified; when the Command is 0xfffc, the Mode is identified. If the value of the Mode is 0xffff, in the data signal Data1 to Data168 is duty cycle data which is written into the phase drive module. If the value of the Mode is 0x0000, in the data signal Data1 to Data168 is phase data which is written into the phase drive module.

It will be noted that, the above Data1 to Data168 use 16 bits, which may be increased or decreased based on use requirements in practical applications. Further, the contents of the Command are not limited herein.

(3) Data1 to Data168: phase data and duty cycle data;
(4) CheckSum: the data is subjected to XOR processing to generate a processing value:
CheckSum=Indicator^Command^Mode^Data1 . . . ^Data168.

Therefore, in some embodiments, the master control board may modify the scanning frequency of the display screen (the touch plate therein) or the backlight refresh phase of the backlight source, so as to achieve self-correction of the misreport point.

Based on the above backlight control method, some embodiments of the present disclosure provides a backlight system, including a master control board and a backlight control unit; the backlight control unit is connected with the master control board;

the master control board is configured to, in response to detecting a report point signal, obtain a backlight control signal including a mode signal that is a phase adjustment signal and a data signal that is a backlight refresh phase;

the backlight control unit is configured to obtain the backlight control signal including a mode signal and a data signal, and obtain the mode signal in the backlight control signal, where the mode signal includes a phase adjustment signal or a local dimming signal; in response to that the mode signal is the phase adjustment signal, write the data signal corresponding to the mode signal into a light source drive module, such that the light source drive module adjusts a phase of a backlight source based on the data signal.

In some embodiments, obtaining, by the backlight control unit, the mode signal in the backlight control signal includes:
analyzing the mode signal in the backlight control signal; where a value of the mode signal includes a first value for indicating a phase adjustment mode and a second value for indicating a local dimming mode;
in response to that the value of the mode signal is the first value, determining the mode signal is the phase adjustment signal; in response to that the value of the mode signal is the second value, determining the mode signal is the local dimming signal.

In some embodiments, obtaining, by the master control board, the backlight control signal including the mode signal that is the phase adjustment signal and the data signal that is the backlight refresh phase includes:
obtaining a current backlight refresh phase and a current scanning frequency of a display screen;
obtaining a next-order backlight refresh phase of the current backlight refresh phase under the current scanning frequency in a preset lookup table;
adjusting the mode signal of the backlight control signal to the phase adjustment signal and the data signal to the next-order backlight refresh phase so as to obtain the backlight control signal.

In some embodiments, wherein obtaining, by the master control board, the backlight control signal including the mode signal that is the phase adjustment signal and the data signal that is the backlight refresh phase includes:
obtaining a backlight refresh phase corresponding to a position in the report point signal;
determining a target backlight refresh phase more than a preset threshold from the backlight refresh phase in the preset lookup table;
adjusting the mode signal of the backlight control signal to the phase adjustment signal and the data signal to the target backlight refresh phase so as to obtain the backlight control signal.

In some embodiments, the backlight control unit is further configured to, after receiving the backlight control signal, perform checking on the backlight control signal.

In some embodiments, the backlight control unit is further configured to:
in response to that the mode signal is the local dimming signal, write the data signal corresponding to the mode signal into the light source drive module, such that the light source drive module adjusts a backlight brightness based on the data signal in the backlight control signal.

It is to be noted that the backlight system shown in some embodiments are matched with the contents of the method embodiments and thus the backlight system can be referred to the contents of the method embodiments and will not be described again herein.

Some embodiments of the present disclosure provide a display device. With continuous reference to FIG. 1, the display device includes the above backlight system and display screen;
the display screen is configured to generate a report point signal and send the report point signal to the backlight system;
the backlight system is configured to, based on the report point signal, adjust a backlight refresh phase.

It is to be noted that the display device shown in these embodiments is matched with the contents of the method embodiments and thus the display device can be referred to the contents of the method embodiments and will not be described again herein.

In some exemplary embodiments, there is further provided a non-transitory computer readable storage medium, for example, a memory including executable computer programs. The above executable computer programs may be processed by a processor to implement the method in the embodiment shown in FIG. 2. The readable storage medium may be read only memory (ROM), random access memory (RAM), CD-ROM, magnetic tape, floppy disk, and optical data storage device and the like.

Other implementations of the present disclosure will be apparent to a person skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A backlight control method, comprising:
obtaining a backlight control signal, wherein the backlight control signal comprises a mode signal and a data signal;
obtaining the mode signal in the backlight control signal, wherein the mode signal comprises a phase adjustment signal or a local dimming signal;
in response to that the mode signal is the phase adjustment signal, writing the data signal corresponding to the mode signal into a light source drive module, such that the light source drive module adjusts a phase of a backlight source based on the data signal; and
in response to detecting a report point signal, obtaining a backlight control signal comprising the mode signal that is a phase adjustment signal and the data signal that is a backlight refresh phase;
wherein obtaining the backlight control signal comprising the mode signal that is the phase adjustment signal and the data signal that is the backlight refresh phase comprises:
obtaining a current backlight refresh phase and a current scanning frequency of a display screen;
obtaining, at the current scanning frequency, an immediately-next backlight refresh phase after the current backlight refresh phase in order in a preset lookup table; and
adjusting the mode signal of the backlight control signal to the phase adjustment signal and the data signal to the immediately-next backlight refresh phase so as to obtain the backlight control signal;
or,
obtaining a backlight refresh phase corresponding to a position in the report point signal;
determining a target backlight refresh phase whose difference from the backlight refresh phase is more than a preset threshold in a preset lookup table;
adjusting the mode signal of the backlight control signal to the phase adjustment signal and the data signal to the target backlight refresh phase so as to obtain the backlight control signal.

2. The method according to claim 1, wherein obtaining the mode signal in the backlight control signal comprises:
analyzing the mode signal in the backlight control signal; wherein a value of the mode signal comprises a first value for indicating a phase adjustment mode and a second value for indicating a local dimming mode;
in response to that the value of the mode signal is the first value, determining the mode signal is the phase adjustment signal; in response to that the value of the mode signal is the second value, determining the mode signal is the local dimming signal.

3. The method according to claim 1, further comprising:
sending a target scanning frequency corresponding to the phase adjustment signal to the display screen, such that a scanning frequency of the display screen is adjusted to the target scanning frequency.

4. The method according to claim 1, further comprising:
performing checking on the backlight control signal.

5. The method according to claim 1, further comprising:
in response to that the mode signal is the local dimming signal, writing the data signal corresponding to the mode signal into the light source drive module, such that the light source drive module adjusts a backlight brightness based on the data signal in the backlight control signal.

6. A backlight system, comprising a master control board and a backlight control unit, the backlight control unit is connected with the master control board;
the master control board is configured to, in response to detecting a report point signal, obtain a backlight control signal comprising a mode signal that is a phase adjustment signal and a data signal that is a backlight refresh phase;
the backlight control unit is configured to obtain the backlight control signal comprising the mode signal and the data signal, and obtain the mode signal in the backlight control signal, wherein the mode signal comprises a phase adjustment signal or a local dimming signal; and in response to that the mode signal is the phase adjustment signal, write the data signal corresponding to the mode signal into a light source drive module, such that the light source drive module adjusts a phase of a backlight source based on the data signal;

wherein obtaining, by the master control board, the backlight control signal comprising the mode signal that is the phase adjustment signal and the data signal that is the backlight refresh phase comprises:

obtaining a current backlight refresh phase and a current scanning frequency of a display screen;

obtaining an immediately-next backlight refresh phase after the current backlight refresh phase in order under the current scanning frequency in a preset lookup table;

adjusting the mode signal of the backlight control signal to the phase adjustment signal and the data signal to the immediately-next backlight refresh phase so as to obtain the backlight control signal;

or, obtaining a backlight refresh phase corresponding to a position in the report point signal;

determining a target backlight refresh phase whose difference from the backlight refresh phase is more than a preset threshold in a preset lookup table;

adjusting the mode signal of the backlight control signal to the phase adjustment signal and the data signal to the target backlight refresh phase so as to obtain the backlight control signal.

7. The system according to claim 6, wherein obtaining, by the backlight control unit, the mode signal in the backlight control signal comprises:

analyzing the mode signal in the backlight control signal; wherein a value of the mode signal comprises a first value for indicating a phase adjustment mode and a second value for indicating a local dimming mode;

in response to that the value of the mode signal is the first value, determining the mode signal is the phase adjustment signal; in response to that the value of the mode signal is the second value, determining the mode signal is the local dimming signal.

8. The system according to claim 6, wherein the master control board is further configured to send a target scanning frequency corresponding to the phase adjustment signal to the display screen, such that a scanning frequency of the display screen is adjusted to the target scanning frequency.

9. The system according to claim 6, wherein the backlight control unit is further configured to, after receiving the backlight control signal, perform checking on the backlight control signal.

10. The system according to claim 6, wherein the backlight control unit is further configured to:

in response to that the mode signal is the local dimming signal, write the data signal corresponding to the mode signal into the light source drive module, such that the light source drive module adjusts a backlight brightness based on the data signal in the backlight control signal.

11. A display device, comprising the backlight system according to claim 6 and a display screen;

the display screen is configured to generate a report point signal and send the report point signal to the backlight system;

the backlight system is configured to, based on the report point signal, adjust a backlight refresh phase.

12. A non-transitory computer readable storage medium, wherein executable computer programs in the storage medium are executed by a processor to perform:

obtaining a backlight control signal, wherein the backlight control signal comprises a mode signal and a data signal;

obtaining the mode signal in the backlight control signal, wherein the mode signal comprises a phase adjustment signal or a local dimming signal;

in response to that the mode signal is the phase adjustment signal, writing the data signal corresponding to the mode signal into a light source drive module, such that the light source drive module adjusts a phase of a backlight source based on the data signal; and in response to detecting a report point signal, obtaining a backlight control signal comprising the mode signal that is a phase adjustment signal and the data signal that is a backlight refresh phase;

wherein obtaining the backlight control signal comprising the mode signal that is the phase adjustment signal and the data signal that is the backlight refresh phase comprises:

obtaining a current backlight refresh phase and a current scanning frequency of a display screen;

obtaining, at the current scanning frequency, an immediately-next backlight refresh phase after the current backlight refresh phase in order in a preset lookup table;

adjusting the mode signal of the backlight control signal to the phase adjustment signal and the data signal to the immediately-next backlight refresh phase so as to obtain the backlight control signal;

or, obtaining a backlight refresh phase corresponding to a position in the report point signal;

determining a target backlight refresh phase whose difference from the backlight refresh phase is more than a preset threshold in a preset lookup table;

adjusting the mode signal of the backlight control signal to the phase adjustment signal and the data signal to the target backlight refresh phase so as to obtain the backlight control signal.

13. The non-transitory computer readable storage medium according to claim 12, wherein when obtaining the mode signal in the backlight control signal, the processor is caused to perform:

analyzing the mode signal in the backlight control signal; wherein a value of the mode signal comprises a first value for indicating a phase adjustment mode and a second value for indicating a local dimming mode; and in response to that the value of the mode signal is the first value, determining the mode signal is the phase adjustment signal; in response to that the value of the mode signal is the second value, determining the mode signal is the local dimming signal.

14. The non-transitory computer readable storage medium according to claim 12, wherein the processor is further caused to perform:

sending a target scanning frequency corresponding to the phase adjustment signal to the display screen, such that a scanning frequency of the display screen is adjusted to the target scanning frequency.

15. The non-transitory computer readable storage medium according to claim 12, wherein the processor is further caused to perform:

performing checking on the backlight control signal.

16. The non-transitory computer readable storage medium according to claim 12, wherein the processor is further caused to perform:

in response to that the mode signal is the local dimming signal, writing the data signal corresponding to the mode signal into the light source drive module, such that the light source drive module adjusts a backlight brightness based on the data signal in the backlight control signal.

* * * * *